United States Patent
Yeung et al.

(10) Patent No.: US 10,410,129 B2
(45) Date of Patent: Sep. 10, 2019

(54) USER PATTERN RECOGNITION AND PREDICTION SYSTEM FOR WEARABLES

(71) Applicant: Intel Corporation, Santa Clara, CA (US)

(72) Inventors: Fai Yeung, San Jose, CA (US); Fu Zhou, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 889 days.

(21) Appl. No.: 14/976,728

(22) Filed: Dec. 21, 2015

(65) Prior Publication Data

US 2017/0178011 A1    Jun. 22, 2017

(51) Int. Cl.
| | |
|---|---|
| G06N 5/04 | (2006.01) |
| G06F 16/901 | (2019.01) |
| G06F 1/16 | (2006.01) |
| G06N 7/00 | (2006.01) |
| G06F 3/01 | (2006.01) |

(52) U.S. Cl.
CPC ............. *G06N 5/047* (2013.01); *G06F 1/163* (2013.01); *G06F 3/01* (2013.01); *G06F 16/9024* (2019.01); *G06N 7/005* (2013.01)

(58) Field of Classification Search
None
See application file for complete search history.

(56) References Cited

U.S. PATENT DOCUMENTS

| | | | |
|---|---|---|---|
| 6,535,877 B1 | 3/2003 | Hirayama | |
| 9,832,068 B2 * | 11/2017 | McSherry | ......... G06F 17/30539 |
| 2007/0300185 A1 | 12/2007 | Macbeth et al. | |
| 2010/0318576 A1 | 12/2010 | Kim | |
| 2011/0071818 A1 | 3/2011 | Jiang | |
| 2014/0100835 A1 | 4/2014 | Majumdar et al. | |
| 2015/0324078 A1 | 11/2015 | Dipin | |
| 2016/0148103 A1 * | 5/2016 | Sarrafzadeh | ......... G06N 99/005 |
| | | | 706/46 |

OTHER PUBLICATIONS

Park et al., Predicting User Activities in the Sequence of Mobile Context for Ambient Intelligence Environment Using Dynamic Bayesian Network, 2010, ICAART 2010—2nd International Conference on Agents and Artificial Intelligence, pp. 311-316 (Year: 2010).*

International Search Report and Written Opinion issued in PCT Application No. PCT/US2016/062901, dated Mar. 6, 2017, 12 pages.

(Continued)

*Primary Examiner* — Alan Chen
(74) *Attorney, Agent, or Firm* — Grossman, Tucker, Perreault & Pfleger, PLLC

(57) ABSTRACT

One embodiment provides an apparatus. The apparatus includes a companion device. The companion device includes pattern recognition logic to construct a reference graph model based, at least in part, on a plurality of events captured from at least one of the companion device and a wearable device. The reference graph model includes at least one path, each path including one trigger node, at least one event node and a respective edge incident to each event node, a first edge coupling the trigger node and a first event node, a weight associated with each edge corresponding to a likelihood that a second event will follow a first event within a minimum trigger time interval.

22 Claims, 4 Drawing Sheets

(56) References Cited

OTHER PUBLICATIONS

Krause, et al.; "Context-Aware Mobile Computing: Learning Context-Dependent Personal Preferences from a Wearable Sensor Array"; IEEE Transactions on Mobile Computing, vol. 5, No. 2, Feb. 2006, 15 pages.
Fatima, et al.; "A Unified Framework for Activity Recognition-Based Behavior Analysis and Action Prediction in Smart Homes"; Sensors 2013, 13, ISSN 1424-8220; 2013, pp. 2682-2699.

* cited by examiner

| 230 Vertex (node) | max_count | Total_count |
|---|---|---|
| T1 | 6 | 7 |
| T2 | 0 | 0 |
| T3 | 1 | 1 |
| A1 | 6 | 6 |
| A2 | 5 | 7 |
| A3 | 1 | 1 |
| A4 | 2 | 2 |
| A5 | 1 | 1 |
| A6 | 0 | 0 |

| 250 Edge | | |
|---|---|---|
| $v_i$ | $v_j$ | weight |
| T1 | A1 | 6 |
| T1 | A2 | 1 |
| A1 | A2 | 6 |
| A2 | A4 | 2 |
| A2 | A5 | 5 |
| A4 | A5 | 2 |
| A5 | A6 | 1 |
| T3 | A3 | 1 |
| A3 | A6 | 1 |

USER PATTERN RECOGNITION AND PREDICTION SYSTEM FOR WEARABLES

FIELD

The present disclosure relates to a user pattern recognition and prediction system, in particular to, a user pattern recognition and prediction system for wearables.

BACKGROUND

Wearable devices such as smart watches and/or activity trackers may be configured to monitor user activity and to output user activity information to a companion device, e.g., a smart phone. The wearable devices may be further configured to receive notifications and other information from the companion device.

User behavior and associated user activity may be repetitive. For example, a user may listen to music while exercising. Thus, the user may manually initiate data gathering by the activity tracker, followed by launching a music app, followed by selecting music to be played. The user may repeat this sequence whenever the user exercises. Repeatedly manually making such selections may be tedious.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
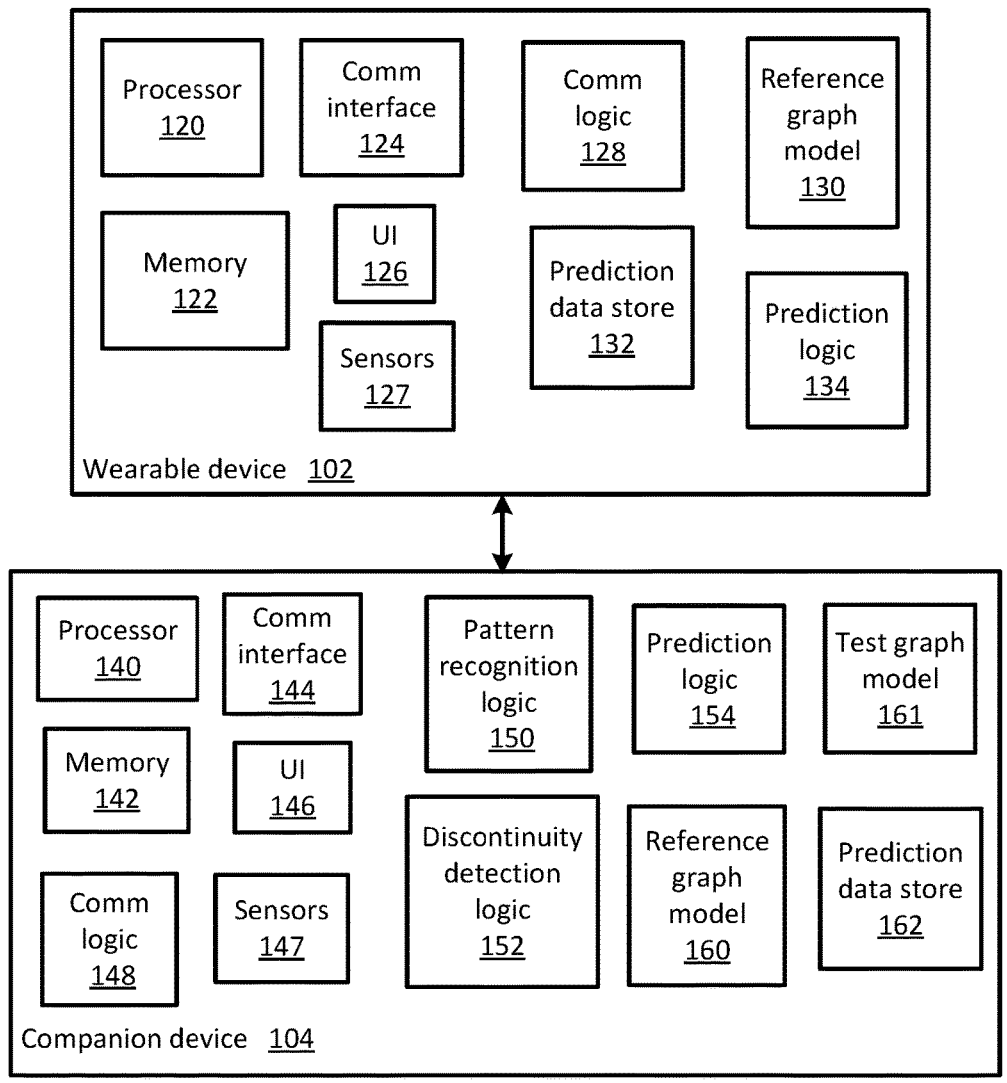
FIG. 1 illustrates a functional block diagram of a user pattern recognition and prediction system for wearables consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to a user pattern recognition and prediction system for wearables. An apparatus, method and/or system are configured to capture events from a wearable device and/or a companion device and to build (i.e., construct) a reference graph model based, at least in part, on the captured events. As used herein, an event may include, but is not limited to, a user action (e.g., launch or close an app), a change in sensor data corresponding to a change in state, a device alert and/or a system notification. State may include, but is not limited to, a user activity (e.g., walking, running, biking, etc.), a user location, etc. A change in state may thus correspond to a change in user activity (e.g., start, stop, increase speed, decrease speed) and/or a change in user location.

The reference graph model is configured to model user habitual behavior that includes one or more consecutive events. The reference graph model may correspond to an acyclic graph. An acyclic graph may include a plurality of nodes with each pair of nodes coupled by a respective edge. Each node may correspond to an event and two nodes coupled by an edge correspond to two consecutive events. An acyclic graph may not include loops and may be stored as a linked list.

Thus, the reference graph model may include at least one path. Each path may include one trigger node, at least one event node and a respective edge incident to each event node. A first edge may couple the trigger node and a first event node. A weight associated with each edge may correspond to a likelihood that a second event will follow a first event within a minimum trigger time interval.

The reference graph model is configured to be lightweight so that it may be built on a companion device and utilized on the companion device and/or a wearable device. A likelihood that a second event will follow a first event within a time interval may be represented by a weight. For example, the weight may correspond to a count related to historical user behavior. The weight may be associated with an edge. The reference graph model may be built using a pattern recognition technique configured to detect and register user habitual patterns.

Over time, user behavior may change and/or a different user may utilize the companion device and/or the wearable device. A change in user behavior corresponds to a discontinuity. For example, a change in behavior may be due to a change in user environment, e.g., travel. In another example, a change in behavior may be due to a change in user, e.g., a change in device ownership. The apparatus, method and/or system may be configured to check for a discontinuity using a test model built using relatively more recent events. A discontinuity may be indicated by a difference between the reference graph model and the test model greater than a threshold difference. If a discontinuity is detected, then the current reference model may be replaced with the test model and/or rebuilt. If a discontinuity is not detected, then the current reference model may be updated with the contents of the test model.

The reference graph model may then be utilized to predict user behavior, e.g., to predict a next event based, at least in part, on a current event. In other words, the reference graph model represents a historical record of consecutive events that may then be utilized to predictively provide a next possible event. For example, the prediction may be utilized to prefetch content that may then be provided to the user relatively more quickly than content that has not been prefetched. In another example, a routine, i.e., a sequence of events determined based, at least in part, on the reference graph model, may be stored so that a user may access the routine with a single user input. Thus, user experience may be enhanced.

FIG. 1 illustrates a functional block diagram of a user pattern recognition and prediction system 100 for wearables consistent with several embodiments of the present disclosure. The system 100 includes a wearable device 102 and a companion device 104. Wearable device 102 may include, but is not limited to, a wearable computer, a "smart" watch, a smart bracelet, a smart wristband, smart glasses, smart clothing, an activity tracker, a fitness tracker, etc. Companion device 104 may include, but is not limited to, a mobile telephone including, but not limited to a smart phone (e.g., iPhone®, Android®-based phone, Blackberry®, Symbian®-based phone, Palm®-based phone, etc.); a laptop computer, a tablet computer (e.g., iPad®, GalaxyTab® and the like), an ultraportable computer, an ultramobile computer, a netbook computer and/or a subnotebook computer; etc.

Wearable device 102 includes a processor 120, memory 122, a communication interface 124, a user interface (UI) 126, sensors 127 and communication logic 128. In an embodiment, wearable device 102 may include a reference graph model 130, a prediction data store 132 and prediction logic 134. Companion device 104 includes a processor 140, memory 142, a communication interface 144, a user interface (UI) 146, sensors 147 and communication logic 148. In an embodiment, companion device 104 may include pattern recognition logic 150, discontinuity detection logic 152, prediction logic 154, a reference graph model 160, a test graph model 161 and a prediction data store 162.

Processors 120, 140 are configured to perform operations of wearable device 102 and companion device 104, respectively. UI 126, 146 are configured to capture user inputs and to output information to the user. For example, UI 126, 146 may include a touch sensitive display, a microphone, a speaker, a visual indicator (e.g., light emitting diode), etc. Sensors 127, 147 are configured to capture user activity (e.g., walking, biking, running, etc.) and/or user location. For example, sensors 127, 147 may include an accelerometer, a GPS (global positioning system) receiver, etc. Wearable device 102 and companion device 104, e.g., communication logic 128, 148, may be configured to communicate using one or more near field communication (NFC) protocols. NFC may include, for example, Bluetooth®. Thus, communication interfaces 128, 148 may comply and/or be compatible with one or more NFC protocol(s).

In operation, pattern recognition logic 150, may be configured to build reference graph model 160. Pattern recognition logic 150 may be configured to capture event data from wearable device 102 and/or companion device 104. Event data, e.g., a user action, a change in state associated with a user activity, a change in state associated with a user location, a device alert and/or a system notification may have an associated generally short duration. Events with generally short durations may facilitate simplifying the user pattern recognition and prediction system for wearables. In other words, capturing events may result in capturing relatively less data than monitoring and capturing a user activity for the duration of the user activity.

A user action may include, but is not limited to, launching an app, closing an app, sending a communication (e.g., a text message, an email), setting up a reminder, lowering a speaker volume, etc. User activity may include physical activity including, but not limited to, standing, sitting, walking, running, biking, etc. Changes in state related to user activity may then include starting the activity, stopping the activity, increasing or decreasing a speed associated with the activity, etc. A device alert is related to a status of the device. Device alerts may include a warning for high device temperature, a critical battery alert, a periodic battery level update, etc. System notifications may include, but are not limited to, email received, calendar notification, a social media notification, a missed call, etc. Thus, pattern recognition logic 150 may be configured to capture event data.

A graph model may include a plurality of vertices (i.e., nodes) coupled by edges. The nodes may be trigger nodes or event nodes and each node may correspond to a captured and/or detected event. A trigger node corresponds to an event that occurred (and was detected) after a trigger time interval elapsed in which no other events were detected. For example, the minimum trigger time interval may be two minutes. In another example, the minimum trigger time interval may be greater than two minutes or less than two minutes.

The duration of the minimum trigger time interval is configured to differentiate unrelated events from related events. In other words, consecutive events that occur within a time proximity to one another may be related. Related events may then be included in a same path in the reference graph model. Two events that are consecutive in time but that occur with a relatively longer time interval between them may not be related. Accordingly, a trigger event associated with a trigger node may be unrelated to prior events and may be related to subsequent events that occur within a time interval with a duration less than the minimum trigger time interval. An event node corresponds to an event detected following a trigger event or another event where a duration of the time interval between consecutive events is less than the minimum trigger time interval.

In the graph model, an edge is configured to couple two consecutive event nodes or a trigger node and a consecutive event node. A duration of a time interval between the two consecutive events corresponding to the consecutive event nodes is less than the minimum trigger time interval. Similarly, a duration of a time interval between the trigger event and a first consecutive event is less than the minimum trigger time interval. Thus, whether an event is a trigger event or a consecutive event is related to a time duration of a time interval in which no event is detected, preceding the event. A trigger event and related consecutive events may be included in the reference graph model, modeled as a trigger node and event nodes coupled by respective edges. A sequence of nodes that includes one trigger node and at least one event node may then correspond to a path.

Initially, a reference graph model, e.g., reference graph model 160, may be initialized with a plurality of vertices (i.e., nodes), each vertex corresponding to a respective event, and without edges. In other words, the initialized reference graph model may include a plurality of nodes, with each node corresponding to a respective event, and may not include edges. Edges that couple consecutive nodes may be defined, i.e., added, as the reference graph model is built. The edges may be defined based, at least in part, on data gathering. The data gathering is configured to capture event data and durations of time intervals between capture of events that are consecutive in time.

During data capture, raw sensor data captured by wearable device 102 and/or companion device 104 may be preprocessed to provide corresponding events. For example, raw sensor data may include user physical activity data. For example, raw data from an accelerometer may be processed to identify an associated physical activity. The associated physical activity may then be classified as, for example, standing-still, slow walking, fast walking, running, or biking. The output from the preprocessing may then be related to an event, i.e., a change of user activity, such as walking started, running stopped, biking started, etc. The output event data from the preprocessor may then include event data such as "walking started", "biking stopped", etc. The preprocessing is configured to provide a concise representation of events, i.e., to produce event data.

The event data may then be captured by pattern recognition logic 150 and the reference graph model 160 may be constructed. Construction of reference graph model 160 may be initiated by detection of a first event. The first event may then correspond to trigger event and may be entered into (e.g., annotate) the reference graph model 160. In other words, a vertex, i.e., node, may be identified as a trigger node. Subsequent events may then be captured and the reference graph model 160 may be updated based, at least in part, on the captured subsequent events. The subsequent events may include additional trigger events and/or non-trigger events, i.e., consecutive events. Whether the subsequent events are trigger events or consecutive events may be determined based, at least in part, on a duration of a time interval that does not include a detected event, preceding detection of the subsequent event, as described herein. The reference graph model 160 may be updated to include the subsequent events as corresponding trigger nodes and/or event nodes coupled by respective edges.

Nodes corresponding to pairs of consecutive events that are related may be coupled by respective edges in the graph model 160. Each edge may be annotated with a weight. The weight coupling a first event node and a second event node corresponds to a likelihood that a second event will follow a first event. For example, the weight may correspond to a count of the number of times the second event followed the first event for the pair of consecutive events during the data gathering. The nodes may be annotated with one or more counts. A first count, max_count, may correspond to a weight associated with a most likely fan out edge coupled to the associated node. A second count, total_count, may correspond to a sum of the respective weights for all the edges leaving the associated node, i.e., all of the fan out edges. The capturing and updating may continue for a time period and/or until a sufficient amount of events have been captured. The capture time period and/or amount of events may be predefined and may be adjusted to increase or decrease an amount of events captured.

Figures 2A, 2B, 2C:
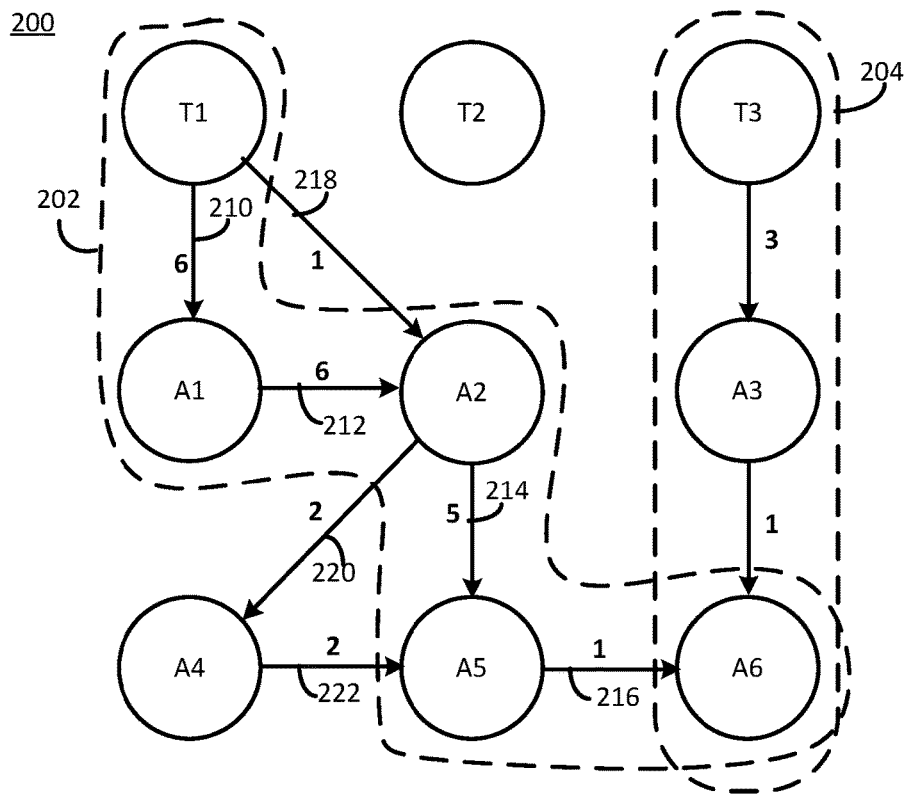
FIG. 2A illustrates an example graph model consistent with one embodiment of the present disclosure.
FIG. 2B illustrates a table of vertex annotations that correspond to the graph model of FIG. 2A.
FIG. 2C illustrates a table of edge annotations that correspond to the graph model of FIG. 2A.

FIG. 2A illustrates an example graph model 200 consistent with one embodiment of the present disclosure. FIG. 2B illustrates a table 230 of vertex annotations that correspond to the graph model 200. FIG. 2C illustrates a table 250 of edge annotations that correspond to the graph model 200. FIGS. 2A, 2B and 2C may be best understood when considered together.

Turning first to FIG. 2A, example graph model 200 includes nine nodes (i.e., vertices). In this example 200, three nodes, T1, T2, T3, are trigger nodes and six nodes, A1, A2, A3, A4, A5 and A6, are event nodes. Trigger node T1 is coupled to a plurality of subsequent events that form a plurality of paths. As used herein, a path begins at a trigger node and includes one or more consecutive event node(s) coupled by respective edges. For example, a first path 202 begins at trigger node T1, includes event node A1 followed by event node A2 followed by event node A5 and terminates at event node A6. In another example, a second path 204 begins at trigger node T3, includes event node A3 and terminates at event node A6.

In a path, one trigger node and a consecutive event node or two consecutive event nodes are coupled by edges. For example, in the first path 202, trigger node T1 is coupled to event node A1 by edge 210, event node A1 is coupled to event node A2 by edge 212, event node A2 is coupled to event node A5 by edge 214 and event node A5 is coupled to event node A6 by edge 216. Trigger node T1 is further coupled to event node A2 by edge 218. Event node A2 is further coupled to event node A4 by edge 220. Event node A4 is coupled to event node A5 by edge 222. Thus, the first path 202 includes one trigger node, e.g., trigger node T1, a plurality of event nodes A1, A2, A5, A6 and the plurality of edges 210, 212, 214, 216 with each edge incident to a respective event node. For example, edge 210 is incident to event node A1, edge 212 is incident to event node A2, etc.

Each event node A1, A2, . . . , A6 may have an associated fan in and an associated fan out and each trigger node T1, T2, T3 may have an associated fan out. Fan in corresponds to a number of edges incident to the event node. For example, fan in associated with event node A2 is 2. In another example, fan out associated with event node A2 is also 2. Thus, fan in edges associated with event node A2 include edges 212 and 218 and the fan out edges associated with event node A2 include edges 214 and 220.

Turning now to FIG. 2B, table 230 includes a plurality of entries (i.e., rows) with each entry corresponding to a respective vertex (i.e., node) in graph model 200. A format of each entry is (v, max_count, total_count) where v is a vertex identifier. Thus the first column contains node identifiers for the nodes illustrated in example graph model 200. The second column, max_count, corresponds to the count associated with a fan out edge that has a maximum weight for the identified node, i.e., that has a maximum weight for the fan out edges associated with the identified node. The third column, total_count, corresponds to a sum of the weights of all the fan out edges associated with the identified node. Thus, a relative value of max_count to total_count may provide an indication of a likelihood that the fan out edge associated with max_count will be traversed relative to other fan out edges for a respective node.

Turning now to FIG. 2C, table 250 includes a plurality of entries (i.e., rows) with each entry corresponding to a respective edge in graph model 200. A format of each entry is ($v_i$, $v_j$, weight) where $v_i$ and $v_j$ are vertex identifiers. Thus, the first column contains node identifiers for starting vertices for the edges illustrated in example graph model 200. The second column contains node identifiers for ending vertices for the edges illustrated in example graph model 200. The third column, weight, corresponds to a weight associated with a respective edge. Thus, table 250 is configured to describe each edge included in example graph model 200 by starting node, $v_i$, ending node, $v_j$, and associated weight. In other words, the edge is a fan out edge for the starting node and a fan in edge (i.e., is incident to) for the ending node. The weight is related to the likelihood that the event associated with ending node, $v_j$, will follow the event associated with the starting node, $v_i$, within a time interval.

For example, for trigger node T1, max_count is 6, corresponding to edge 210 that couples trigger node T1 to event node A1. Edge 210, in graph model 200, is annotated with the weight, e.g., 6. The weight may correspond to a count. Edge 210 corresponds to the first entry in table 250, i.e. (T1, A1, 6). Continuing with this example, for trigger node T1, total_count is 7, corresponding to a sum of the weight associated with edge 210 (e.g., 6) and the weight associated with edge 218 (e.g., 1). Trigger node T1 corresponds to the first entry in table 230, i.e., (T1, 6, 7).

The counts in table 230 and the edge weights in table 250 and graph model 200 are related to a likelihood that an associated edge will be traversed. In other words, the counts and weights are related to the likelihood that a selected next event will follow a current event. Thus, a larger count and/or weight corresponds to a greater likelihood.

Turning again to FIG. 1, pattern recognition logic 150 is configured to construct reference graph model 160 over a time period by capturing event data, as described herein. Initially, reference graph model 160 may be populated by a plurality of vertices, i.e., event nodes, corresponding to the plurality of possible events. Pattern recognition logic 150 may be configured to wait for a valid trigger event. Once the trigger event is detected, construction of the reference graph model 160 may be initiated.

For each subsequent detected event, whether the event is a trigger event or is a non-trigger, i.e., consecutive, event may be determined. The determination may be made based, at least in part, on a time duration between a most recent prior event and the current detected event. If the detected event is a trigger event, the event node associated with the detected event may be identified as a trigger node. If the detected event is not a trigger event, whether the detected event is a new event for the current sequence may be determined. In other words, an event corresponding to the detected event may have occurred before or the detected event may be a new event, i.e., may not have occurred before for the current sequence. "Current sequence" corresponds to a path that includes a trigger event, i.e., trigger node, and one or more subsequent consecutive events, i.e., event node(s).

If the detected event is a new event, a corresponding edge may be initialized with a starting vertex identifier and the ending vertex identifier, the ending vertex identifier corresponding to the detected event. If the detected event is not a new event, whether the detected event creates a loop may be determined. If the detected event would create a loop, the detected event may be ignored. In other words, paths in the reference graph model may not contain loops. If the detected event is not a new event and would not create a loop, then the total_count and possibly max_count associated with the most recent prior event node and the weight associated with the edge that couples the most recent prior event node in the detected event node may be updated, e.g., incremented.

These operations may be repeated until there are no detected events for a predetermined wait time configured to end a data-gathering sequence or a new trigger event is detected. In other words, a detected event that occurs at a time greater than the minimum trigger interval from the prior event, may correspond to a new trigger event. If a new trigger event is detected, operations related to updating model graph 160 may be repeated for the new trigger event and one or more paths associated with the new trigger event.

In some situations, a user activity may begin or may be ongoing at a time that a trigger event is detected and may continue for an entire path associated with the trigger event. In these situations, pattern recognition logic 150 may be configured to annotate the trigger event with an activity status identifier. Thus, although the graph model may generally include discrete events, an ongoing user activity may also be captured and may provide additional information related to predicting a subsequent event.

Data-gathering may continue for a predefined time duration, e.g., a month, a number of weeks, etc., and/or until an adequate amount of data has been captured. For example, the initial data collection may capture 14 days of user activities. In another example, the initial data collection may capture more than 14 days or less than 14 days of user activity.

After the initial data collection has completed, data cleanup may occur. For example, edges with relatively small weights may be removed from the graph model 160. Thus, the reference graph model may be simplified by eliminating relatively less likely edge(s) and event node(s). In another example, weights may be normalized by dividing a weight associated with a respective edge by the total_count associated with the starting node for the respective edge. Normalization is configured to provide a normalized view of the strength of patterns interpreted from the graph model and may facilitate the decision making when using the reference graph model.

Thus, a reference graph model 160 may be constructed, e.g., pattern recognition logic 150, as described herein. Once the reference graph model 160 has been constructed, it may be stored to, i.e., copied to, wearable device 102 and stored as reference graph model 130 on the wearable device 102. Wearable device 102, e.g., prediction logic 134, may then be configured to utilize reference graph model 130 for prediction operations, as described herein.

Over time, user behavior associated with the reference graph models 130, 160 may change. For example, user activities may change if the user is traveling, working and/or on vacation. In another example, ownership of the wearable device 102 and/or the companion device 104 may change. The change in ownership and associated change in user may appear to the pattern recognition logic 150 as a change in user behavior. As a result, accuracy of predicted user behavior using the reference models 130, 160 may be degraded.

Whether the user and/or user behavior has changed may be determined through a discontinuity analysis, i.e., checking for a discontinuity. For example, discontinuity detection logic 152 may be configured to check for the discontinuity. Initially, a test graph model 161 may be constructed. Construction of the test graph model 161 is similar to construction of the reference graph model 160, as described herein. A time interval associated with constructing the test graph model 161 may generally be less than the time interval associated with constructing the reference graph model 160. In other words, the test graph model 161 may be constructed using relatively less captured event data than was captured in the construction of the reference graph model 160. Capturing less event data is configured to support constructing the test graph model 161 in less time and consuming fewer device resources compared to construction of the reference graph model 160.

Once the test graph model 161 has been constructed, discontinuity detection logic 152 may be configured to compare the test graph model 161 to the reference graph model 160. A penalty may be determined for one or more paths of the reference graph model 160 relative to the test graph model 161. The penalty represents a difference between the test graph model 161 and the reference graph model 160. A relatively larger penalty value may correspond to a relatively larger discontinuity. For example, penalty may correspond to a difference between weights associated with a selected path in the reference graph model 160 and weights associated with a corresponding path in the test graph model 161. For example, a most likely path in the reference graph model 160 may be selected for the comparison. The most likely path is the path that has consecutive edges whose associated weights are local maximums. For example, path 202 in example reference graph model 200 corresponds to the most likely path. In other words, for each group of fan out edges, the fan out edge with the maximum associated weight is included in path 202.

Initially, whether there is a corresponding edge in the test graph model 161 for each edge in the most likely path of reference graph model 160 may be determined. If there is not a corresponding edge, then the penalty for that edge may be set to a relatively high value, e.g., 100. If there is a corresponding edge, then the penalty for that edge may correspond to a difference between the weight associated with the reference graph model edge and the weight associated with the test graph model corresponding edge. In some embodiments, the edge weights may be normalized by, for example, the total_count associated with a starting node, prior to the comparison. The penalty associated with each edge in the test graph model 161 that corresponds to the most likely path of the reference graph model 160 may then be summed to yield a total penalty for the path. Whether the total penalty is greater than a cut off penalty may then be determined. The cut off penalty corresponds to a threshold penalty for determining whether or not a discontinuity exists. For example, the cut off penalty may be 40%. In another example, the cut off penalty may be greater than or less than 40%.

If a discontinuity is detected, then a new reference model may be built as described herein. The new reference model 160 may be initialized to nodes without defined edges or may be initialized to the test graph model 161. If a discontinuity is not detected, then the current reference model 160 may be updated with the contents of the test graph model 161. In this manner, discontinuity in user behavior may be detected and accommodated.

The reference graph model 130 may be utilized by prediction logic 134 and/or reference graph model 160 may be utilized by prediction logic 164 to predict a user behavior. Prediction logic 134, 154 may be configured to implement one or more technique(s) to predict a most likely next event. The techniques may include, but are not limited to, a greedy technique, a depth-first traverse technique and/or a routine-based recommendation. The techniques may be configured to determine a most probable (i.e., most likely) path and/or a most probable (i.e., most likely) next event. The most probable path and/or most probable next event may be identified based, at least in part, on a detected event and associated detected event node. The most probable path includes the associated detected event node. The predicted most likely next event and/or information associated with the predicted most likely next event may then be stored in prediction data store 132 and/or 162.

Prediction logic 134, 154 may be configured to perform prediction operations when the associated device 102 and/or 104 is in an active or an idle state. In other words, prediction logic 134, 154 may not be configured to activate (i.e., "wake up") a device 102 and/or 104 that is not in the active or idle state. Such an approach is configured to reduce and/or minimize power consumption associated with prediction operations.

The greedy technique may be utilized to identify a most probable path. For example, the greedy technique may be configured to make a locally optimum choice at each node. The greedy technique is configured to identify a most probable path that includes the associated detected event node. Beginning with the associated detected event node and repeating for each subsequent event node in the path, prediction logic 134, 154 may be configured to identify the fan out edge associated with the maximum weight for the fan out edges for a respective event node. The most likely next event node may then correspond to the event node coupled to the maximum weight edge. In other words, the maximum weight edge is a fan in edge for the most likely next event node.

In another example, the greedy technique may be utilized to maximize an overall likelihood of successive events. In other words, a total weight of edges included in a path may be considered. Beginning with the fan out edge associated with the maximum weight, weights of a number of subsequent edges along a selected path may be summed. For example, three subsequent edges may be included in the sum. In another example, more than three or less than three subsequent edges may be included in the sum. The number of subsequent edges may be constrained by the path. In other words, the path may end and the number of subsequent edges may thus be limited. The process may be repeated for each possible path that includes the detected event node. The summed weights may then be compared and the path associated with the highest sum may then be selected. A most likely next event node may then be on the selected path.

Depth-first search (DFS) can be used as the traversing technique to determine a most probable path in the graph model. Each traverse starts at the trigger root and explores as far as possible along each branch before backtracking. When backtracking, an unexplored path with the highest number of unvisited edges may be explored. This process may be repeated until all paths are explored. The path with the greatest sum of edge weights may then correspond to the most probable path. In other words, if the traverse starts with the trigger event node, the most likely next event corresponds to the next node in the most probable path.

In an example, prediction of user behavior may be utilized to prefetch information and/or data into local memory, e.g., memory 122 and/or memory 142, in anticipation of a user request for the information. The information may include, but is not limited to, user profile data, device user interface assets, information stored to the cloud, etc. Prefetching the information is configured to reduce a response time experienced by the user if the user requests such information. The information to be prefetched may be determined using a prediction technique based, at least in part, on a current and/or most recent detected event and based, at least in part, on the reference graph model 130, 160. The prefetched information may then be stored in prediction data store 132, 162. If the prefetched information is not requested by the user, then it may be discarded.

In another example, a routine-based recommendation may be determined by prediction logic 134, 154. In other words, user behavior may include one or more user routine(s). For example, an exercise routine may include running and/or biking while listening to music. Thus, the exercise routine may have as consecutive events starting running or starting biking followed by launching a music app followed by selecting a particular style of music. The corresponding path may then include three event nodes: start running or start biking, launch music app, select music.

In another example, a user behavior sequence (i.e., a routine) may include arriving at a movie theater, adjusting a social media status to unavailable, changing device status (for a companion device 104 that is a smart phone) to airplane mode and silencing device notifications. Prediction logic 154 may be configured to detect this routine based, at least in part, on reference graph model 160. In other words, this movie theater user behavior sequence may correspond to a path with relatively high likelihood edges.

Prediction logic 134 and/or 154, after identifying a routine, may be configured to query the user via, e.g., UI 126, 146, whether the user wishes to enable the identified routine in response to detecting the trigger event. If the user selects yes for the exercise routine, then whenever the trigger event of starting running or starting biking is detected, prediction logic 134, 154 may be configured to launch a music app and play the selected music. If the user selects yes for the movie theater routine, then whenever the trigger event of arriving at the movie theater is detected, prediction logic 134, 154 may be configured to adjust the social media status to unavailable, to change the device status to airplane mode and to silence device notifications. User selections associated with routines may be stored in prediction data store 132, 162.

Thus, reference graph model 160 may be constructed by pattern recognition logic 150, based, at least in part, on a history of user behavior captured by wearable device 102 and/or companion device 104. The reference graph model 160, once constructed, may then be stored to wearable device 102, as reference graph model 130. The reference graph models 130, 160 may then be utilized by prediction logic 134 and/or 154 to predict a most likely next event, i.e., to predict a user behavior based on historical user behavior. Whether user behavior has changed (i.e., checking for a discontinuity) may be determined intermittently and/or periodically by discontinuity detection logic 152 and reference graph model 130, 160 may be updated or replaced based, at least in part, on the result of the determination.

Figure 3:
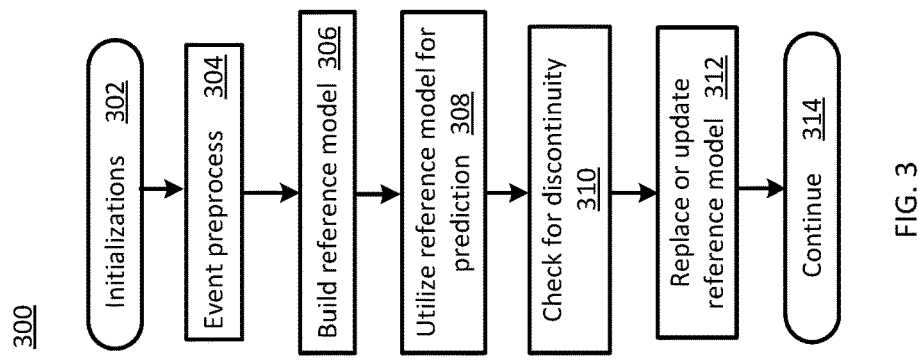
FIG. 3 is a flowchart of user pattern recognition and prediction operations according to various embodiments of the present disclosure.

FIG. 3 is a flowchart 300 of user pattern recognition and prediction operations according to various embodiments of the present disclosure. In particular, the flowchart 300 illustrates constructing a reference model, utilizing the reference model for prediction and checking for a discontinuity. The operations of flowchart 300 may be performed, for example, by pattern recognition logic 150, discontinuity detection logic 152, prediction logic 134 and/or prediction logic 154 of FIG. 1.

The operations of flowchart 300 may begin with initialization operations 302. For example, a plurality of vertices corresponding to event nodes may be defined. Operation 304 may include event preprocessing. The reference model may be built at operation 306. The reference model may be utilized for prediction at operation 308. A check for discontinuity may be performed at operation 310. For example, a test graph model may be built and compared to the reference graph model. The reference model may be replaced or updated at operation 312. For example, the reference graph model may be replaced if a discontinuity is detected or updated if a discontinuity is not detected. Program flow may then continue at operation 314.

Figure 4:
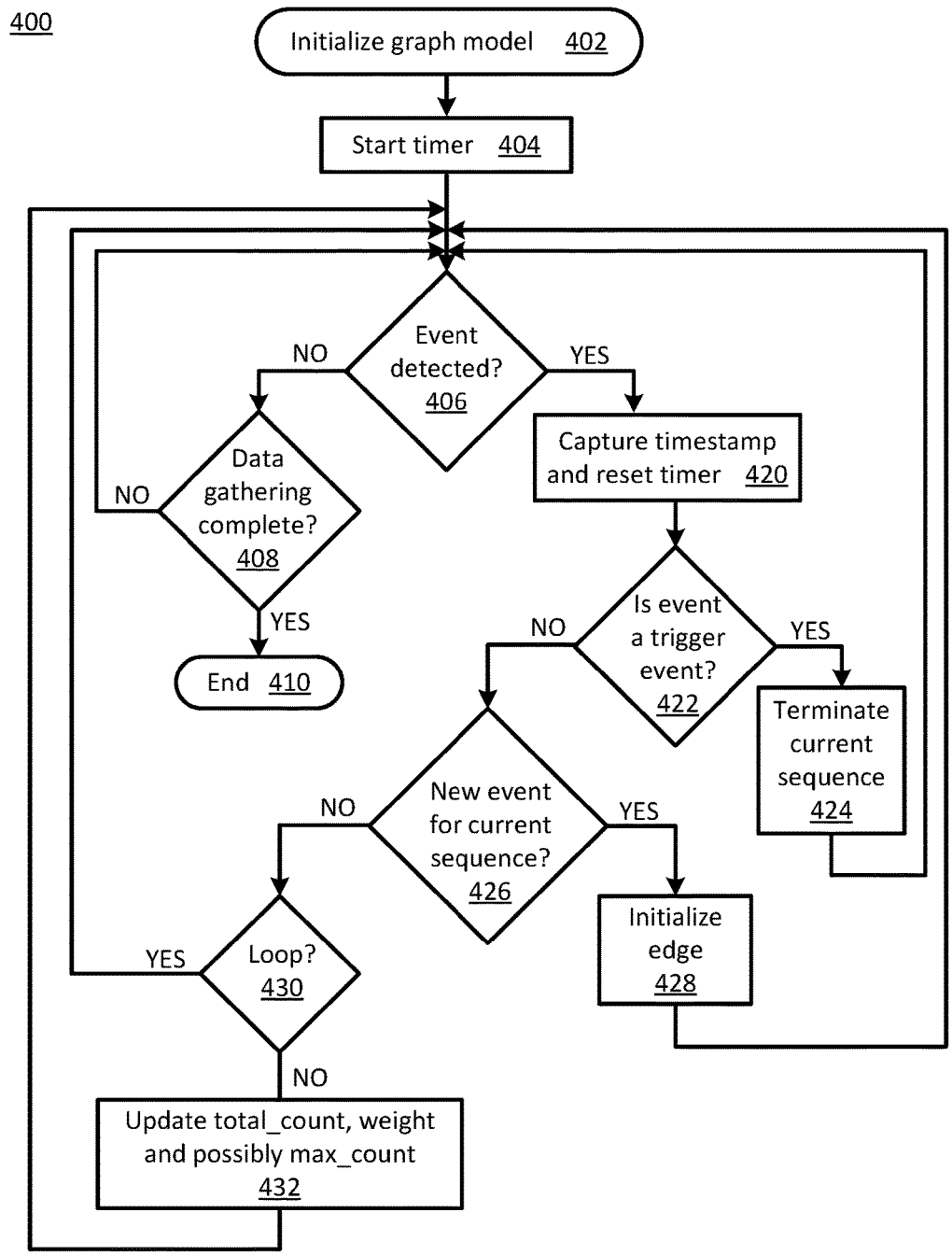
FIG. 4 is a flowchart of reference model building operations according to at least one operation of FIG. 3.

FIG. 4 is a flowchart 400 of reference model building operations according to at least one operation of FIG. 3. In particular, the flowchart 400 illustrates building a reference model. Flowchart 400 is one example of operation 306 of FIG. 3. The operations of flowchart 400 may be performed, for example, by pattern recognition logic 150 of FIG. 1.

The operations of flowchart 400 may begin with initializing a graph model at operation 402. A timer may be started at operation 404. The timer is configured to indicate whether a minimum trigger time interval duration has elapsed since a prior detected event or not. Whether an event is detected may be determined at operation 406. If an event is not detected, whether data-gathering is complete may be determined at operation 408. If data-gathering is complete, program flow may end at operation 410. If data-gathering is not complete, program flow may return to operation 406.

If an event is detected, a timestamp may be captured and the timer may be reset at operation 420. Whether the detected event is a trigger event may be determined at operation 422. If the detected event is a trigger event, a current sequence (i.e., path) may be terminated at operation 424. Program flow may then return to operation 406. If the detected event is not a trigger event, whether the detected event is a new event for the current sequence may be determined at operation 426. If the detected event is a new event for the current sequence, then an associated edge may be initialized at operation 428. For example, a new edge may be defined that couples the detected new event and a most recent prior event. The new edge may have an associated weight of 1. Program flow may then return to operation 406.

If the detected event is not a new event for the current sequence, then whether the detected event would create a loop in the graph model may be determined at operation 430. If the detected event would create a loop, program flow may return to operation 406. In other words, the detected event is ignored and creation of a loop is avoided. If the detected event would not create a loop in the graph model, then a total count (i.e., total_count) and possibly a maximum count (i.e., max_count) associated with a most recently detected prior event node may be updated and a weight associated with a corresponding incident edge may be updated at operation 432. In other words, the incident edge is coupled between the event nodes that correspond to the detected event and the most recently detected prior event. Program flow may then return to operation 406.

Thus, a reference model may be constructed.

Figure 5:
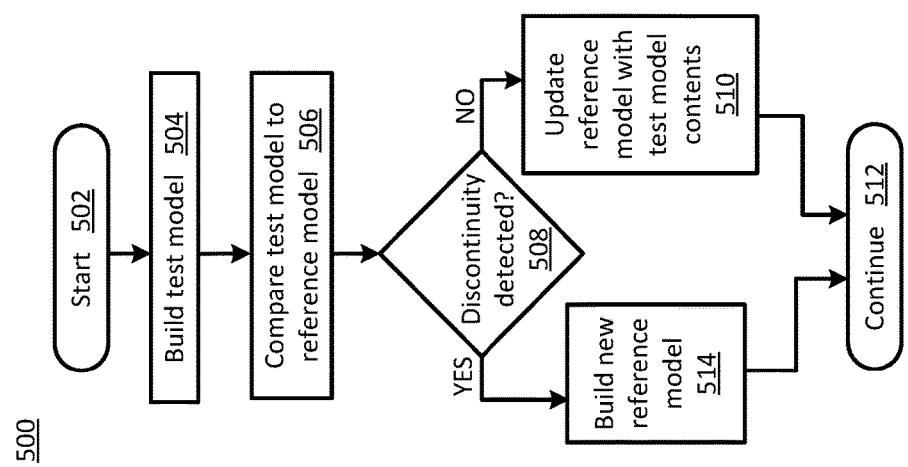
FIG. 5 is a flowchart of discontinuity checking operations according to at least one operation of FIG. 3.

FIG. 5 is a flowchart 500 of discontinuity checking operations according to at least one operation of FIG. 3. In particular, the flowchart 500 illustrates checking for a discontinuity and replacing or updating the reference model based on the result. Thus, the flowchart 500 is one example of operations 310 and 312 of FIG. 3. The operations of flowchart 500 may be performed, for example, by discontinuity detection logic 152 of FIG. 1.

Operations of flowchart 500 may begin with start 502. A test graph model may be built at operation 504. The test graph model may be compared to the reference graph model at operation 506. Whether a discontinuity is detected may be determined at operation 508. For example, a penalty may be determined related to one or more difference(s) between a selected path in the reference graph model and a corresponding path in the test graph model. If a discontinuity is detected a new reference model may be built at operation 514. Program flow may then continue at operation 512. If a discontinuity is not detected, the reference model may be updated with test model contents at operation 510. Program flow may then proceed to operation 512.

Thus, whether or not a discontinuity exists may be determined and the reference model may be updated or replaced.

Figure 6:
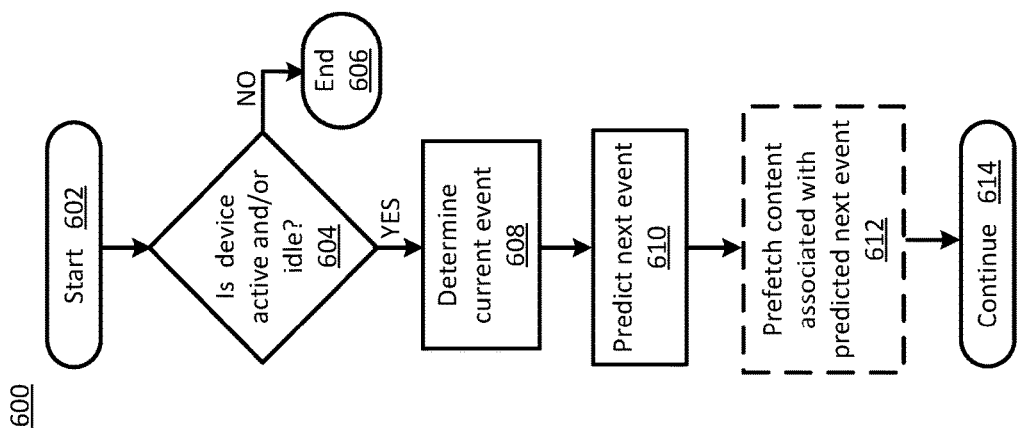
FIG. 6 is a flowchart of prediction and prefetching operations according to at least one operation of FIG. 3.

FIG. 6 is a flowchart 600 of prediction and prefetching operations according to at least one operation of FIG. 3. In particular, the flowchart 600 illustrates predicting a next event and prefetching content associated with the predicted next event. Thus, at least a portion of the flowchart 600 corresponds to operation 308 of FIG. 3. The operations of flowchart 600 may be performed, for example, by prediction logic 134 and/or prediction logic 154 of FIG. 1.

Operations of flowchart 600 may begin with start 602. Whether a device is active and/or idle may be determined at operation 604. For example, the device may be a wearable device or a companion device. If the device is not active and is not idle, program flow may end at operation 606. Thus, activating an inactive device may be avoided. If the device is active and/or idle, a current event may be determined at operation 608. A next event may be predicted at operation 610. In some embodiments, content associated with the predicted next event may be prefetched at operation 612. Program flow may continue at operation 614.

Thus, a next event may be predicted and content may be prefetched.

While the flowcharts of FIGS. 3 through 6 illustrate operations according various embodiments, it is to be understood that not all of the operations depicted in FIGS. 3 through 6 are necessary for other embodiments. In addition, it is fully contemplated herein that in other embodiments of the present disclosure, the operations depicted in FIGS. 3, 4, 5 and/or 6 and/or other operations described herein may be combined in a manner not specifically shown in any of the drawings, and such embodiments may include less or more operations than are illustrated in FIGS. 3 through 6. Thus, claims directed to features and/or operations that are not exactly shown in one drawing are deemed within the scope and content of the present disclosure.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) may be configured to manage system resources and control tasks that are run on, e.g., wearable device 102 and/or companion device 104. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units.

Wearable device 102 and/or companion device 104 may comply and/or be compatible with one or more communication specifications, standards and/or protocols. The communications protocols may include but are not limited to wired communications protocols and/or wireless communications protocols.

For example, wearable device 102 and/or companion device 104 may comply and/or be compatible with Bluetooth® Core Specification, version 4.2, published by Bluetooth® SIG (Special Interest Group), Kirkland, Wash., December 2014, and/or later and/or related versions of this standard, e.g., Bluetooth® Low Energy (BLE), Bluetooth® Smart and/or Bluetooth® Core Specification, version 4.0, published June 2010.

In another example, wearable device 102 and/or companion device 104 may comply or be compatible with one or more NFC and/or RFID standards published by the International Standards Organization (ISO) and/or the International Electrotechnical Commission (IEC), including ISO/IEC 14443, titled: Identification cards—Contactless integrated circuit cards—Proximity cards, published in 2008; ISO/IEC 15693: Identification cards—Contactless integrated circuit cards—Vicinity cards, published in 2006, titled: ISO/IEC 18000, titled: Information technology—Radio frequency identification for item management, published in 2008; and/or ISO/IEC 18092, titled: Information technology—Telecommunications and information exchange between systems—Near Field Communication—Interface and Protocol, published in 2004; and/or later versions of these standards.

In another example, wearable device 102 and/or companion device 104 may comply and/or be compatible with IEEE (Institute of Electrical and Electronics Engineers) 802.15.4-2006 standard titled: IEEE Standard for Information technology—Telecommunications and information exchange between systems—Local and metropolitan area networks—Specific requirements Part 15.4: Wireless Medium Access Control (MAC) and Physical Layer (PHY) Specifications for Low Rate Wireless Personal Area Networks (LR-WPANS), published in 2006 and/or later and/or related versions of this standard.

In another example, wearable device 102 and/or companion device 104 may comply and/or be compatible with a ZigBee specification and/or standard, published and/or released by the ZigBee Alliance, Inc., including, but not limited to, ZigBee 3.0, draft released November 2014, ZigBee RF4CE, ZigBee IP, and/or ZigBee PRO published in 2012, and/or later and/or related versions of these standards.

In another example, wearable device 102 and/or companion device 104 may comply and/or be compatible with an IPv6 (Internet Protocol version 6) over Low Power Wireless Personal Area Networks (6LoWPAN) standard: RFC (Request for Comments) 6282, titled Compression Format for IPv6 Datagrams over IEEE 802.15.4-Based Networks, published by the Internet Engineering Task Force (IETF), September 2011, and/or later and/or related versions of this standard.

Companion device 104 may comply and/or be compatible with one or more third generation (3G) telecommunication standards, recommendations and/or protocols that may comply and/or be compatible with International Telecommunication Union (ITU) Improved Mobile Telephone Communications (IMT)-2000 family of standards released beginning in 1992, and/or later and/or related releases of these standards. For example, companion device 104, communication partner device 108 and/or network 106 may comply and/or be compatible with one or more CDMA (Code Division Multiple Access) 2000 standard(s) and/or later and/or related versions of these standards including, for example, CDMA2000 1×RTT, 1× Advanced and/or CDMA2000 1×EV-DO (Evolution-Data Optimized): Release 0, Revision A, Revision B, Ultra Mobile Broadband (UMB). In another example, companion device 104, communication partner device 108 and/or network 106 may comply and/or be compatible with UMTS (Universal Mobile Telecommunication System) standard and/or later and/or related versions of these standards.

Companion device 104 may comply and/or be compatible with one or more fourth generation (4G) telecommunication standards, recommendations and/or protocols that may comply and/or be compatible with ITU IMT-Advanced family of standards released beginning in March 2008, and/or later and/or related releases of these standards. For example, companion device 104, communication partner device 108 and/or network 106 may comply and/or be compatible with IEEE standard: IEEE Std 802.16™-2012, title: IEEE Standard for Air Interface for Broadband Wireless Access Systems, released August 2012, and/or related and/or later versions of this standard. In another example, companion device 104, communication partner device 108 and/or network 106 may comply and/or be compatible with Long Term Evolution (LTE), Release 8, released March 2011, by the Third Generation Partnership Project (3GPP) and/or later and/or related versions of these standards, specifications and releases, for example, LTE-Advanced, Release 10, released April 2011.

Memory 122, 142 may each include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, an apparatus, method and/or system are configured to capture events from a wearable device and/or a companion device and to construct a reference graph model. The reference graph model may then be utilized to check for a discontinuity and/or to predict user behavior.

EXAMPLES

Examples of the present disclosure include subject material such as a method, means for performing acts of the method, a device, or of an apparatus or system related to user pattern recognition and prediction system for wearables, as discussed below.

Example 1

According to this example, there is provided and apparatus. The apparatus includes a companion device. The companion device includes pattern recognition logic to construct a reference graph model based, at least in part, on a plurality of events captured from at least one of the companion device and a wearable device. The reference graph model includes at least one path, each path including one trigger node, at least one event node and a respective edge incident to each event node, a first edge coupling the trigger node and a first event node, a weight associated with each edge corresponding to a likelihood that a second event will follow a first event within a minimum trigger time interval.

Example 2

This example includes the elements of example 1, wherein the companion device further includes discontinuity detection logic to check for a discontinuity and to replace the reference graph model if a discontinuity is detected or update the reference graph model if a discontinuity is not detected.

Example 3

This example includes the elements of example 2, wherein the discontinuity detection logic is to build a test model and to compare the test model to the reference graph model to check for the discontinuity.

Example 4

This example includes the elements of example 1, wherein the companion device further includes prediction logic to predict a next event based, at least in part, on a current event and based, at least in part, on the reference graph model.

Example 5

This example includes the elements of example 4, wherein the prediction logic is further to prefetch content associated with the predicted next event.

Example 6

This example includes the elements according to any one of examples 1, 2 or 4, wherein each event is selected from the group including a user action, a change in sensor data corresponding to a change in state, a device alert and a system notification.

Example 7

This example includes the elements of example 6, wherein a change in state corresponds to a change in at least one of a user activity and/or a user location.

Example 8

This example includes the elements of example 6, wherein the user action is selected from the group including launching an app, closing an app, sending a communication, setting up a reminder and lowering a speaker volume, the device alert is selected from the group including a warning for high device temperature, a critical battery alert and a periodic battery level update, and the system notification is selected from the group including an email received, a calendar notification, a social media notification and a missed call.

Example 9

This example includes the elements according to any one of examples 1, 2 or 4, wherein the reference graph model corresponds to an acyclic graph.

Example 10

This example includes the elements according to any one of examples 1, 2 or 4, wherein the trigger node corresponds to occurrence of an event after a trigger time interval elapsed in which no other events occurred.

Example 11

This example includes the elements according to any one of examples 1, 2 or 4, wherein each weight corresponds to a respective count related to historical user behavior.

Example 12

According to this example, there is provided and apparatus. The apparatus includes a wearable device. The wearable device includes a reference graph model received from a companion device, the reference graph model constructed based, at least in part, on a plurality of events captured from at least one of a companion device and the wearable device. The reference graph model includes at least one path, each path including one trigger node, at least one event node and a respective edge incident to each event node, a first edge coupling the trigger node and a first event node, a weight associated with each edge corresponding to a likelihood that a second event will follow a first event within a minimum trigger time interval.

Example 13

This example includes the elements of example 12, wherein the wearable device further includes prediction logic to predict a next event based, at least in part, on a current event and based, at least in part, on the reference graph model.

Example 14

This example includes the elements of example 13, wherein the prediction logic is further to prefetch content associated with the predicted next event.

Example 15

This example includes the elements of example 12, wherein each event is selected from the group including a user action, a change in sensor data corresponding to a change in state, a device alert and a system notification.

Example 16

This example includes the elements of example 15, wherein the state is selected from the group including a user activity and a user location.

Example 17

This example includes the elements of example 15, wherein a change in state corresponds to a change in at least one of a user activity and/or a user location.

Example 18

This example includes the elements of example 15, wherein the user action is selected from the group including launching an app, closing an app, sending a communication, setting up a reminder and lowering a speaker volume, the device alert is selected from the group including a warning for high device temperature, a critical battery alert and a periodic battery level update, and the system notification is selected from the group including an email received, a calendar notification, a social media notification and a missed call.

Example 19

This example includes the elements according to any one of examples 12, 13 or 15, wherein the reference graph model corresponds to an acyclic graph.

Example 20

This example includes the elements according to any one of examples 12, 13 or 15, wherein the trigger node corresponds to occurrence of an event after a trigger time interval elapsed in which no other events occurred.

Example 21

This example includes the elements according to any one of examples 12, 13 or 15, wherein each weight corresponds to a respective count related to historical user behavior.

Example 22

According to this example, there is provided a method. The method includes constructing, by pattern recognition logic, a reference graph model based, at least in part, on a plurality of events captured from at least one of a companion device and a wearable device. The reference graph model includes at least one path, each path including one trigger node, at least one event node and a respective edge incident to each event node, a first edge coupling the trigger node and a first event node, a weight associated with each edge corresponding to a likelihood that a second event will follow a first event within a minimum trigger time interval.

Example 23

This example includes the elements of example 22, further including checking, by discontinuity detection logic, for a discontinuity and replacing, by the discontinuity detection logic, the reference graph model if a discontinuity is detected or updating, by the discontinuity detection logic, the reference graph model if a discontinuity is not detected.

Example 24

This example includes the elements of example 23, further including building, by the discontinuity detection logic, a test model and comparing, by the discontinuity detection logic, the test model to the reference graph model to check for the discontinuity.

Example 25

This example includes the elements of example 22, further including predicting, by prediction logic, a next event based, at least in part, on a current event and based, at least in part, on the reference graph model.

Example 26

This example includes the elements of example 25, further including prefetching, by the prediction logic, content associated with the predicted next event.

Example 27

This example includes the elements of example 22, wherein each event is selected from the group including a user action, a change in sensor data corresponding to a change in state, a device alert and a system notification.

Example 28

This example includes the elements of example 27, wherein a change in state corresponds to a change in at least one of a user activity and/or a user location.

Example 29

This example includes the elements of example 27, wherein the user action is selected from the group including launching an app, closing an app, sending a communication, setting up a reminder and lowering a speaker volume, the device alert is selected from the group including a warning for high device temperature, a critical battery alert and a periodic battery level update, and the system notification is selected from the group including an email received, a calendar notification, a social media notification and a missed call.

Example 30

This example includes the elements of example 22, wherein the reference graph model corresponds to an acyclic graph.

Example 31

This example includes the elements of example 22, wherein the trigger node corresponds to occurrence of an event after a trigger time interval elapsed in which no other events occurred.

Example 32

This example includes the elements of example 22, wherein each weight corresponds to a respective count related to historical user behavior.

Example 33

According to this example, there is provided a computer readable storage device having stored thereon instructions that when executed by one or more processors result in the following operations including constructing a reference graph model based, at least in part, on a plurality of events captured from at least one of a companion device and a wearable device. The reference graph model includes at least one path, each path including one trigger node, at least one event node and a respective edge incident to each event node, a first edge coupling the trigger node and a first event node, a weight associated with each edge corresponding to a likelihood that a second event will follow a first event within a minimum trigger time interval.

Example 34

This example includes the elements of example 33, wherein the instructions that when executed by one or more processors results in the following additional operations including checking for a discontinuity and replacing the reference graph model if a discontinuity is detected or updating the reference graph model if a discontinuity is not detected.

Example 35

This example includes the elements of example 34, wherein the instructions that when executed by one or more processors results in the following additional operations including building a test model and comparing the test model to the reference graph model to check for the discontinuity.

Example 36

This example includes the elements of example 33, wherein the instructions that when executed by one or more processors results in the following additional operations including predicting a next event based, at least in part, on a current event and based, at least in part, on the reference graph model.

Example 37

This example includes the elements of example 36, wherein the instructions that when executed by one or more processors results in the following additional operations including prefetching content associated with the predicted next event.

Example 38

This example includes the elements according to any one of examples 33, 34 or 36, wherein each event is selected from the group including a user action, a change in sensor data corresponding to a change in state, a device alert and a system notification.

Example 39

This example includes the elements of example 38, wherein a change in state corresponds to a change in at least one of a user activity and/or a user location.

Example 40

This example includes the elements of example 38, wherein the user action is selected from the group including launching an app, closing an app, sending a communication, setting up a reminder and lowering a speaker volume, the device alert is selected from the group including a warning for high device temperature, a critical battery alert and a periodic battery level update, and the system notification is selected from the group including an email received, a calendar notification, a social media notification and a missed call.

Example 41

This example includes the elements according to any one of examples 33, 34 or 36, wherein the reference graph model corresponds to an acyclic graph.

Example 42

This example includes the elements according to any one of examples 33, 34 or 36, wherein the trigger node corresponds to occurrence of an event after a trigger time interval elapsed in which no other events occurred.

Example 43

This example includes the elements according to any one of examples 33, 34 or 36, wherein each weight corresponds to a respective count related to historical user behavior.

Example 44

According to this example, there is provided a device. The device includes means for constructing, by pattern recognition logic, a reference graph model based, at least in part, on a plurality of events captured from at least one of a companion device and a wearable device. The reference graph model includes at least one path, each path including one trigger node, at least one event node and a respective edge incident to each event node, a first edge coupling the trigger node and a first event node, a weight associated with each edge corresponding to a likelihood that a second event will follow a first event within a minimum trigger time interval.

Example 45

This example includes the elements of example 44, further including means for checking, by discontinuity detection logic, for a discontinuity and means for replacing, by the discontinuity detection logic, the reference graph model if a discontinuity is detected or means for updating, by the discontinuity detection logic, the reference graph model if a discontinuity is not detected.

Example 46

This example includes the elements of example 45, further including means for building, by the discontinuity detection logic, a test model and means for comparing, by the discontinuity detection logic, the test model to the reference graph model to check for the discontinuity.

Example 47

This example includes the elements of example 44, further including means for predicting, by prediction logic, a next event based, at least in part, on a current event and based, at least in part, on the reference graph model.

Example 48

This example includes the elements of example 47, further including means for prefetching, by the prediction logic, content associated with the predicted next event.

Example 49

This example includes the elements according to any one of examples 44, 45 or 47, wherein each event is selected from the group including a user action, a change in sensor data corresponding to a change in state, a device alert and a system notification.

Example 50

This example includes the elements of example 49, wherein a change in state corresponds to a change in at least one of a user activity and/or a user location.

Example 51

This example includes the elements of example 49, wherein the user action is selected from the group including launching an app, closing an app, sending a communication, setting up a reminder and lowering a speaker volume, the device alert is selected from the group including a warning for high device temperature, a critical battery alert and a periodic battery level update, and the system notification is selected from the group including an email received, a calendar notification, a social media notification and a missed call.

Example 52

This example includes the elements according to any one of examples 44, 45 or 47, wherein the reference graph model corresponds to an acyclic graph.

Example 53

This example includes the elements according to any one of examples 44, 45 or 47, wherein the trigger node corresponds to occurrence of an event after a trigger time interval elapsed in which no other events occurred.

Example 54

This example includes the elements according to any one of examples 44, 45 or 47, wherein each weight corresponds to a respective count related to historical user behavior.

Example 55

A system including at least one device arranged to perform the method of any one of claims 22 to 32.

Example 56

A device including means to perform the method of any one of claims 22 to 32.

Example 57

A computer readable storage device having stored thereon instructions that when executed by one or more processors result in the following operations including: the method according to any one of claims 22 through 32.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
a companion device comprising:
pattern recognition logic to construct a reference graph model based at least in part on a plurality of events captured from at least one of the companion device and a wearable device
the reference graph model comprising at least one path, each path comprising one trigger node, at least one event node and a respective edge incident to each event node, a first edge coupling the trigger node and a first event node, a weight associated with each edge corresponding to a likelihood that a second event will follow a first event within a minimum trigger time interval.

2. The apparatus of claim 1, wherein the companion device further comprises discontinuity detection logic to check for a discontinuity and to replace the reference graph model if a discontinuity is detected or update the reference graph model if a discontinuity is not detected.

3. The apparatus of claim 2, wherein the discontinuity detection logic is to build a test model and to compare the test model to the reference graph model to check for the discontinuity.

4. The apparatus of claim 1, wherein the companion device further comprises prediction logic to predict a next event based at least in part on a current event and on the reference graph model.

5. The apparatus of claim 4, wherein the prediction logic is further to prefetch content associated with the predicted next event.

6. The apparatus of claim 1, wherein each event is selected from the group comprising a user action, a change in sensor data corresponding to a change in state, a device alert and a system notification.

7. An apparatus comprising:
a wearable device comprising:
a reference graph model received from a companion device, the reference graph model constructed based at least in part on a plurality of events captured from at least one of a companion device and the wearable device, the reference graph model comprising at least one path, each path comprising one trigger node, at least one event node and a respective edge incident to each event node, a first edge coupling the trigger node and a first event node, a weight associated with each edge corresponding to a likelihood that a second event will follow a first event within a minimum trigger time interval.

8. The apparatus of claim 7, wherein the wearable device further comprises prediction logic to predict a next event based at least in part on a current event and on the reference graph model.

9. The apparatus of claim 8, wherein the prediction logic is further to prefetch content associated with the predicted next event.

10. The apparatus of claim 7, wherein each event is selected from the group comprising a user action, a change in sensor data corresponding to a change in state, a device alert and a system notification and the state is selected from the group comprising a user activity and a user location.

11. A method comprising:
constructing, by pattern recognition logic, a reference graph model based at least in part on a plurality of events captured from at least one of a companion device and a wearable device,
the reference graph model comprising at least one path, each path comprising one trigger node, at least one event node and a respective edge incident to each event node, a first edge coupling the trigger node and a first event node, a weight associated with each edge corresponding to a likelihood that a second event will follow a first event within a minimum trigger time interval.

12. The method of claim 11, further comprising checking, by discontinuity detection logic, for a discontinuity and replacing, by the discontinuity detection logic, the reference graph model if a discontinuity is detected or updating, by the discontinuity detection logic, the reference graph model if a discontinuity is not detected.

13. The method of claim 12, further comprising building, by the discontinuity detection logic, a test model and comparing, by the discontinuity detection logic, the test model to the reference graph model to check for the discontinuity.

14. The method of claim 11, further comprising predicting, by prediction logic, a next event based at least in part on a current event and the reference graph model.

15. The method of claim 14, further comprising prefetching, by the prediction logic, content associated with the predicted next event.

16. The method of claim 11, wherein each event is selected from the group comprising a user action, a change in sensor data corresponding to a change in state, a device alert and a system notification.

17. A computer readable storage device having stored thereon instructions that when executed by one or more processors result in the following operations comprising:
constructing a reference graph model based, at least in part, on a plurality of events captured from at least one of a companion device and a wearable device,
the reference graph model comprising at least one path, each path comprising one trigger node, at least one event node and a respective edge incident to each event node, a first edge coupling the trigger node and a first event node, a weight associated with each edge corresponding to a likelihood that a second event will follow a first event within a minimum trigger time interval.

18. The device of claim 17, wherein the instructions that when executed by one or more processors results in the following additional operations comprising checking for a discontinuity and replacing the reference graph model if a discontinuity is detected or updating the reference graph model if a discontinuity is not detected.

19. The device of claim 18, wherein the instructions that when executed by one or more processors results in the following additional operations comprising building a test model and comparing the test model to the reference graph model to check for the discontinuity.

20. The device of claim 17, wherein the instructions that when executed by one or more processors results in the following additional operations comprising predicting a next event based at least in part on a current event and on the reference graph model.

21. The device of claim 20, wherein the instructions that when executed by one or more processors results in the following additional operations comprising prefetching content associated with the predicted next event.

22. The device of claim 17, wherein each event is selected from the group comprising a user action, a change in sensor data corresponding to a change in state, a device alert and a system notification.

* * * * *